United States Patent [19]

Wilson et al.

[11] Patent Number: 4,971,936
[45] Date of Patent: Nov. 20, 1990

[54] CATALYST COMPONENT FOR MAKING PRIMARILY ISOTACTIC ELASTOMERIC POLYPROPYLENE OR POLYBUTENE

[75] Inventors: Stanley E. Wilson; Robert C. Job, both of Houston, Tex.

[73] Assignee: Shell Oil Company, Houston, Tex.

[21] Appl. No.: 377,654

[22] Filed: Jul. 10, 1989

[51] Int. Cl.$^5$ ............................................. C08F 4/649
[52] U.S. Cl. .................................. 502/124; 502/126; 526/124
[58] Field of Search ............................. 502/126, 124

[56] References Cited

U.S. PATENT DOCUMENTS

| | | | |
|---|---|---|---|
| H179 | 12/1986 | Klingensmith et al. | 526/125 |
| 3,112,300 | 6/1955 | Natta et al. | 260/93.7 |
| 3,112,301 | 6/1955 | Natta et al. | 260/93.7 |
| 3,175,999 | 8/1956 | Natta et al. | 260/93.7 |
| 3,257,370 | 6/1966 | Natta et al. | 260/93.7 |
| 3,258,455 | 6/1966 | Natta et al. | 260/93.7 |
| 3,305,538 | 2/1967 | Natta et al. | 260/93.7 |
| 3,329,741 | 7/1967 | Schrage et al. | 260/878 |
| 3,335,121 | 8/1967 | Natta et al. | 260/93.7 |
| 3,364,190 | 1/1968 | Emrick | 260/93.7 |
| 3,932,307 | 1/1976 | Setterquist | 252/430 |
| 3,950,269 | 4/1976 | Setterquist | 252/430 |
| 3,971,767 | 7/1976 | Setterquist | 526/65 |
| 4,011,383 | 3/1977 | Setterquist | 526/154 |
| 4,017,525 | 4/1977 | Setterquist | 260/429.3 |
| 4,107,413 | 8/1978 | Giannini et al. | 526/114 |
| 4,107,414 | 8/1978 | Giannini et al. | 526/114 |
| 4,136,243 | 1/1979 | Appleyard et al. | 526/139 |
| 4,226,963 | 10/1980 | Giannini et al. | 526/114 |
| 4,298,722 | 11/1981 | Collette et al. | 526/348.6 |
| 4,325,836 | 4/1982 | Epstein et al. | 252/429 B |
| 4,329,253 | 5/1982 | Goodall et al. | 252/429 B |
| 4,335,225 | 6/1982 | Collette et al. | 525/240 |
| 4,336,360 | 6/1982 | Giannini et al. | 526/114 |
| 4,347,160 | 8/1982 | Epstein et al. | 252/429 B |
| 4,394,291 | 7/1983 | Hawley | 252/429 B |
| 4,442,276 | 4/1984 | Kashiwa et al. | 526/125 |
| 4,472,521 | 9/1984 | Band | 526/126 X |
| 4,487,845 | 12/1984 | Triplett | 502/107 |
| 4,581,342 | 4/1986 | Johnson et al. | 502/119 |
| 4,710,482 | 6/1986 | Job | 502/127 |

FOREIGN PATENT DOCUMENTS

| | | |
|---|---|---|
| 1146699 | 5/1983 | Canada . |
| 0206753 | 6/1986 | European Pat. Off. . |
| 42-16054 | 2/1967 | Japan . |
| 1486194 | 12/1973 | United Kingdom . |
| 1554340 | 6/1977 | United Kingdom . |

OTHER PUBLICATIONS

Polymer Sequence Determination, James C. Randall.
Macromol. Rev 2, Syndiotactic Polypropylene, E. A. Youngman and J. Boor, Jr.
Makromol. Chem., Stereochemical Structure and Molecular Weight Distribution of Polypropylenes, Yoshiharu et al.

*Primary Examiner*—Patrick P. Garvin

[57] ABSTRACT

A catalyst component and catalyst composition useful in the production of elastomeric, primarily isotactic polypropylene and polybutene is disclosed and it comprises the reaction product of a magnesium alkoxide compound and a tetravalent titanium halide wherein the reaction takes place in the presence of an electron donor selected from the group consisting of veratrole and derivatives thereof. The invention also relates to a process for producing such polymers using the above catalyst.

7 Claims, No Drawings

4,971,936

CATALYST COMPONENT FOR MAKING PRIMARILY ISOTACTIC ELASTOMERIC POLYPROPYLENE OR POLYBUTENE

BACKGROUND OF THE INVENTION

This invention relates to a catalyst which is useful in the production of elastomeric, primarily isotactic polyolefins and a process for producing such polymers using said catalyst.

U.S. Pat. No. 4,335,225, issued Jun. 15, 1982, discloses a fractionable elastic polypropylene which is said to have an isotactic content of 55% or less and also to contain some syndiotactic and atactic polypropylene. This patent, and its companions on the catalyst system for making this elastic polypropylene, contain much information about elastic type polypropylene compositions, although the researchers at Montecatini, especially including Giulio Natta, produced some polypropylene compositions which exhibited the same elastomeric characteristics. Specifically, U.S. Pat. Nos. 3,175,999; 3,257,370 and 3,258,455 disclose polypropylene compositions which have elastic type properties. Similarly the researchers at Standard Oil, especially including Donald Emrick, had produced polypropylene compositions which exhibited the same elastomeric characteristics. Specifically U.S. Pat. No. 3,278,512 dicloses primarily isotactic polypropylene compositions which have elastic type properties.

Elastomeric polypropylene is different from the "normal" or more well known polypropylenes. These more well known types are crystalline and amorphous polypropylenes. It is normally accepted that crystalline polypropylene generally has the isotactic or syndiotactic structure and that amorphous polypropylene generally has considerable atactic (sometimes designated as heterotactic) structure. Giulio Natt's U.S. Pat. Nos. 3,112,300 and 3,112,301 describe isotactic polypropylene and give structural formulae for isotactic and syndiotactic polypropylene. The former is a straight chain of propylene units wherein the methyl groups are all aligned on one side of the polymer chain. In the latter, the methyl groups alternate from one side of the chain to the other. In static (heterotactic) polypropylene, the methyl groups are arranged randomly on the two sides of the chain.

Almost all of the polypropylene which is used commercially is highly crystalline polypropylene. These products are well known and have been the subject of many patents and articles. Amorphous polypropylenes, which have very little strength, are used commercially primarily in adhesives and asphalt additives.

SUMMARY OF THE INVENTION

The present invention relates to a catalyst component which is useful in the production of elastomeric, low crystallinity, primarily isotactic polymers of propylene and butene. The catalyst component comprises a magnesium halide which may be the reaction product of a magnesium alkoxide compound which may be of the formula $Mg(R_1)_x(R_2)_{2-x}$, where $R_1$ is an alkoxide or aryl oxide group and $R_2$ is an alkoxide or aryl oxide group or halogen or other anion, and $0 < x \leq 2$, and a tetravalent titanium halide wherein the reaction takes place in the presence of an electron donor selected from the group consisting of veratrole and derivatives thereof which have essentially non-reactive substituents such as $C_2$–$C_{10}$ alkyl, $C_6$–$C_{10}$ aryl, halogen and methoxy.

This invention also relates to a catalyst composition which comprises the reaction product described above and an organoaluminum compound. Finally, the invention relates to a process for the production of such elastomeric, primarily isotactic polymers by polymerizing propylene or butene in the presence of such a catalyst.

DETAILED DESCRIPTION OF THE INVENTION

The "normal" well known polypropylenes discussed above are generally high molecular weight materials which consist of blocks of monomer units of relatively or extremely long average isotactic block length ($<L_{iso}>$), for example, 50 to 200 monomer units. The prior art isotactic polymers (prepared via an $MgCl_2$ supported catalyst) of short average isotactic block length (about 6 to 15 monomer units) are characterized by having relatively low tensile strength and being tacky to the touch and thus are presumed to contain a wide distribution of polymer blocks of varying lengths.

The elastomeric polypropylene and polybutene compositions of the present invention are specifically characterized as being of relatively high tensile strength and non-tacky to the touch; characteristics which may be attributed to a narrow distribution of relatively short block lengths. By "block length" it is meant the number of stereoregular monomer (in this case propylene or butene) insertions which occur before there is a defect in the polymer chain. By "defect" it is meant that the symmetry of the recurring units is ended and there may begin a different structure (e.g. a change from isotactic to syndiotactic or to heterotactic) or units of another monomer may be placed therein. The average block length is determined by a numerical integration of the pentads which occur in the $^{13}C$ NMR spectrum (*Polymer Sequence Determination: Carbon-13 NMR Method*, James C. Randall, Academic Press, NY, 1977). It is theorized that the average block length has a great effect on the properties of the polymer. For instance, relatively short average block lengths, i.e. 7 to 12 monomer units, tend to occur in a flexible and rubbery polymer which exhibits good elastic properties and is relatively strong. On the other hand, block lengths of greater than about 50 are characteristic of commercial, very stiff, highly crystalline isotactic polypropylene.

U.S. Pat. No. 4,335,225, discussed above, discloses how to make an elastomeric polypropylene composition which contains up to 55%, and preferably much less, isotactic polypropylene. This polypropylene has an inherent viscosity of 1.5 to 8, a major melting point between 135° and 155° C., exhibits no yield point, has a tensile set not exceeding 150% and contains 10 to 80% by weight of a diethyl ether soluble fraction which has an inherent viscosity exceeding 1.5 wherein said fraction has an isotactic crystalline content of about 0.5% to about 5% by weight. A special catalyst, which is the subject of several other related patents, is said to be required to make this material. These catalyst are homogeneous zirconium or hafnium catalysts supported upon partially hydrated alumina. Such catalyst systems are difficult to work with, have extremely low productivities (on the order of 1–3% of the productivities of the catalysts of this invention) and are not used commercially to any appreciable extent.

The polypropylenes and polybutenes of the present invention are made with a catalyst system for which there is a wealth of analogous commercial experience and knowledge. In one embodiment the catalyst is comprised of the reaction product of a magnesium alkoxide compound which may be of the formula $Mg(R_1)_x(R_2)_{2-x}$, where $R_1$ is an alkoxide or aryl oxide group and $R_2$ is an alkoxide or aryl oxide group or halogen or other anion, and $0 < x \leq 2$, and a tetravalent titanium halide wherein the reaction takes place in the presence of an electron donor and, optionally, a halogenated hydrocarbon. Such catalysts are well known and have been used for several years commercially. The present catalyst uses an electron donor which has not been heretofore disclosed for use in this type of catalyst. One electron donor which may be used in order to make the polypropylene compositions of the present invention is veratrole or a derivative thereof. Suitable derivatives include 3-methylveratrole (2,3-dimethoxytoluene), 3-methyoxyveratrole (1,2,3-trimethoxybenzene), 4-nitroveratrole and 4-methoxyveratrole (1,2,4-trimethoxybenzene). The catalyst is completed by the addition of an organoaluminum compound and, optionally, a selectivity control agent.

Veratrole has been mentioned previously as an electron donor (U.S. Pat. No. 4,107,414) and a selectivity control agent (U.S. Pat. No. 4,107,413) for specific catalyst systems to prepare highly stereoregular conventional polypropylene. Therefore, it is surprising to observe that that compound and its derivatives may be used as an electron donor to produce extremely short average block length elastomeric polypropylene and polybutene. Examples of halogen containing magnesium compounds that can be used as starting materials for the halogenating reaction are alkoxy and aryloxy magnesium halides, such as isobutoxy magnesium chloride, ethoxy magnesium bromide, phenoxy magnesium iodide, cumyloxy magnesium bromide and naphthenoxy magnesium chloride.

Preferred magnesium compounds to be halogenated are selected from magnesium dialkoxides and magnesium diaryloxides. In such compounds the alkoxide groups suitably have from 1 to 8 carbon atoms, and preferably from 2 to 8 carbon atoms. Examples of these preferred groups of compounds are magnesium di-isopropoxide, magnesium diethoxide, magnesium dibutoxide, magnesium diphenoxide, magnesium dinaphthenoxide and ethoxy magnesium isobutoxide. Magnesium alkoxides disclosed in U.S. Pat. No. 4,806,648, issued Feb. 14, 1989 to Robert C. Job, are also preferred for use herein. Especially preferred is $Mg_4(OCH_3)_6(CH_3OH)_{10}X_2$ where X is resorcinol or a substituted resorcinol monoanion.

Magnesium compounds comprising one alkyl group and one alkoxide or aryloxide group can be employed, as well as compounds comprising one aryl group and one alkoxide or aryloxide group. Examples of such compounds are phenyl magnesium phenoxide, ethyl magnesium butoxide, ethyl magnesium phenoxide and naphthyl magnesium isoamyloxide.

In the halogenation with a halide of tetravelent titanium, the magnesium compounds are preferably reacted to form a magnesium halide in which the atomic ratio of halogen to magnesium is at least 1.2. Better results are obtained when the halogenation proceeds more completely, i.e. yielding magnesium halides in which the atomic ratio of halogen to magnesium is at least 1.5. Except in cases where resorcinols (or other phenolic or substituted phenolic compounds) are used, the most preferred reactions are those leading to fully halogenated reaction products. Such halogenation reactions are suitably effected by employing a molar ratio of titanium compound to magnesium compound of 0.5.1 to 200:1 preferably 1:1 to 100:1. These halogenation reactions are conducted in the additional presence of an electron donor and may include the additional presence of a halohydrocarbon. An inert hydrocarbon diluent or solvent may be used as a substitute for the halohydrocarbon.

Suitable halides of tetravalent titanium include aryloxy- or alkoxy di- and trihalides, such as dihexanoxytitanium dichloride, diethoxytitanium dibromide, isopropoxytitanium tri-iodide and phenoxytitanium trichloride. Titanium tetrahalides are preferred. Most preferred is titanium tetrachloride.

Suitable halohydrocarbons are compounds such as butyl chloride, anyl chloride and the following more preferred compounds. Preferred aliphatic halohydrocarbons are halogen substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,3-trichloroethane are preferred aliphatic halohydrocarbons. Aromatic halohydrocarbons may also be employed, e.g., chlorobenzene, bromobenzene, dichlorobenzene, dichlorodibromobenzene, napthyl cloride, chlorotoluene, dichlorotoluenes, and the like; chlorobenzene and dichlorobenzene are preferred aromatic halohydrocarbons. Chlorobenzene is the most preferred halohydrocarbon.

The halogenation normally proceeds under formation of a solid reaction product which may be isolated from the liquid reaction medium by filtration, decantation or another suitable method. It may be subsequently washed with an inert hydrocarbon diluent, such as n-hexane, isooctane or toluene, to remove any unreacted material, including physically absorbed halohydrocarbon.

The product may also be contacted with a tetravalent titanium compound such as a dialkoxy-titanium dihalide, alkoxy-titanium trihalide, phenoxy-titanium trihalide or titanium tetrahalide. The most preferred titanium compounds are titanium tetrahalides and especially titanium tetrachloride. This treatment increases the content of titanium tetrachloride in the solid catalyst component. This increase should preferably be sufficient to achieve a final atomic ratio of chloride to magnesium in the solid catalyst component of from 1.5 to 2.0, particularly of from 1.8 to 2.0. To this purpose the contacting with the tetravalent titanium compound is most suitably carried out at a temperature of from 60° to 136° during 0.1 to 6 hours, optionally in the presence of an inert hydrocarbon diluent. Particularly preferred contacting periods are between 0.5 to 3.5 hours. The treatment may be carried out in successive contacts of the solid with separate portions of titanium tetrachloride.

After the treatment with tetravelent titanium compound, the catalyst component is suitably isolated from the liquid reaction medium and washed to remove unreacted titanium compound. The titanium content of the final, washed catalyst constituent is suitably between about 1.5 to 3.6 percent by weight or up to about 4.5 percent. The preferred halogen atom, possibly contained in the magnesium compound to be halogenated, and contained in the titanium compound which serves as halogenating agent and in the tetravalent titanium compound with which the halogenated product is contacted, is chlorine.

The material used to wash the catalyst component is an inert, light hydrocarbon liquid. Preferred light hydrocarbon liquids are aliphatic, alicyclic and aromatic hydrocarbons. Examples of such liquids include isopentane, n-hexane, isooctane and toluene, with isopentane being most preferred. The amount of hydrocarbon liquid employed is 5 to 100 cc/gm of catalyst component in each of 2 to 6 separate washes, preferably about 25 cc/gm. The resulting solid component is the protocatalyst, which is used with cocatalyst and optional selectivity control agent in the polymerization process.

Although the invention is operant without any added selectivity control agent, suitable electron donors, which are used in combination with or reacted with an organoaluminum compound as selectivity control agents to retard the production of atactic polymer, are ethers, esters, ketones, phenols, amines, amides, imines, nitriles, phosphines, silanes, phosphites, stibines, arsines, phosphoramides and alcoholates. Examples of suitable donors are those referred to in U.S. Pat. No. 4,442,276. Preferred donors are esters and organic silicon compounds. Preferred esters are esters of aromatic carboxylic acids, such as ethyl and methyl benzoate, p-methoxy ethyl benzoate, p-ethoxy methyl benzoate, p-ethoxy ethyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanote, propyl pivalate. Examples of the organic silicon compounds useful herein include alikoxysilanes and aryloxysilanes of the general formula $R^1{}_n Si(OR^2)_{4-n}$ where n is between zero and three, $R^1$ is a hydrocarbon group or a halogen atom and $R^2$ is a hydrocarbon group. Specific examples inlcude trimethylmethoxysilane, triphenylethoxysilane, dimethyldimethoxysilane, phenyltrimethoxysilane and the like. The donor used as selectivity control agent in the total catalyst may also be the same as the donor used for preparing the titanium containing (procatalyst) constituent. Preferred as selectivity control agent in the total catalyst are p-ethoxy ethyl benzoate, phenyltrimethoxysilane, diphenyldimethoxysilane and diisobutyldimethoxysilane.

The organoaluminum compound to be employed as cocatalyst may be chosen from any of the known activators in olefin polymerization catalyst systems comprising a titanium halide but is most suitably free of halogens. While aluminium trialkyl compounds, dialkylaluminum halides and dialkylaluminum alkoxides may be used, aluminumtrialkyl compounds are preferred, particularly those wherein each of the alkyl groups has 1 to 6 carbon atoms, e.g., triethylaluminum, tri-n-propylaluminum, tri-isobutylaluminum, triisopropylaluminum and dibutyl-n-amylaluminum.

Suitable electron donors for use in the production of the elastomeric, primarily isotactic polymers of the present invention include veratrole and derivatives thereof which have essentially non-reactive substituents such as $C_2$–$C_{10}$ alkyl, $C_6$–$C_{10}$ aryl, halogen and methoxy. Veratrole is otherwise known as 1,2-dimethoxybenzene. Veratrol derivatives which may be used are 3-methylveratrole (2,3-dimethoxytoluene), 3-methoxyveratrole (1,2,3-trimethoxybenzene), 4-nitroveratrole and 4-methoxyveratrole (1,2,4-trimethoxybenzene). The preferred electron donors are 4-methoxyveratrole and 3-methylveratrole because they yield catalysts which produce polymer with the highest tensile strengths.

To prepare the final polymerization catalyst composition, protocatalyst, cocatalyst and optional selectivity control agent may be simply combined, most suitably employing a molar ratio to produce in the final catalyst an atomic ratio of aluminum to titanium of from 1 to 150, and suitably from about 10 to about 150. Increasing the Al:Ti ratio tends to slightly increase catalyst activity at the expense of increased catalyst residue in the unextracted product. These factors will be considered in selecting the Al:Ti ratio for any given process and desired product. In general, Al:Ti ratios in the range of 30:1 and 100:1 and especially of about 50:1 to 80:1 will be found advantageous.

Polymerization of propylene or butene may be conducted with the catalysts of the invention in a liquid system with an inert diluent such as a paraffinic liquid of 3 to 15 carbon atoms per molecule, or in a liquid system containing propylene or butene as sole diluent or together with a small amount of propane or butane, or in vapor phase. Propylene polymerization in liquid phase is conducted at a temperature of 50° to 80° C. and at a pressure sufficient to maintain liquid conditions. In a continuous reaction system, the liquid in the reaction zone is maintained reaction conditions, monomer is continuously charged to the reaction zone, catalyst components are also charged continuously or at frequent intervals to the reaction zone, and reaction mixture containing polymer is withdrawn from the reaction zone continuously or at frequent intervals.

In propylene or butene polymerization, the reaction mixture is typically maintained at conditions at which the polymer is produced as a slurry in the reaction mixture. The catalyst systems of this invention are extremely active and highly specific in propylene polymerization, so that no removal of catalyst components or of atactic polymer from the polymer product is required.

While the catalysts of this invention are particularly adapted for use in continuous polymerization systems, they may, of course, also be employed in batch polymerization. This may be of advantage in multi-stage polymerization in which propylene and propyleneethylene polymers are produced in separate reaction zones arranged in sequence.

It is well known that supported coordination procatalysts and catalyst system of the type used herein are highly sensitive, in varying degrees, to catalyst poisons such as moisture, oxygen, carbon oxides, acetylenic compounds and sulfur compounds. It will be understood that in the practice of this invention, as well as in the following examples, both the equipment and the reagents and diluents are carefully dried and free of potential catalyst poisons.

The productivity of the catalyst is determined as kg polymer/g protocatalyst in a standard one hour batch reaction; it may also be expressed as kg polymer/g Ti. Catalyst activity is sometimes reported as kg polymer/g protocatalyst or Ti/hr. If determined in a standard one hour test, activity thus is numerically the same as productivity.

The specificity towards average isotactic block length may be determined by measuring the amount of xylene soluble polymer (XS), in accordance with regulations of the U.S. Food and Drug Administration. The XS test is carried out as follows: The sample is completely dissolved in xylene in a stirred flask by heating at reflux. The flask is then immersed in a water bath at 25° C. without stirring for one hour, during which a precipitate is formed. The precipitate is filtered off and the solubles present in the filtrate are determined by evaporating a 20 ml aliquot of the filtrate, drying the residue under vacuum, and weighing the residue. The xylene solubles may also include some amorphous and low molecular weight crystalline material. The desirable numerical value of XS for the propylene homopolymers of this invention is typically between about 35% and about 85%.

We have found that it is highly advantageous to make a polymer which is characterized by average isotactic block lengths which are relatively short (on the order of 7 to 20 monomer units) when compared to commonly known crystalline and amorphous polypropylenes or polybutenes. Average block lengths are determined by numerical analysis of the pentads observed in the $^{13}$C NMR spectrum (see *Polymer Sequence Determination, Carbon*-13 *NMR Method* by James C. Randall, Academic Press, NY, 1977). Such polymers generally have block lengths in the range of 50 to 200 monomer units. It is also highly advantageous to have a narrow distribution of block lengths. This is not a characteristic of commonly known amorphous polypropylenes which, although they have relatively low average block lengths, generally have a wide distribution of block lengths and contain much atactic material as suggested by their low tensile strength per unit block length and high tackiness to the touch. It is theorized that it is the narrow distribution of low average block length that imparts to the polymers of this invention high tensile strength per unit block length.

The short block lengths are important because they allow for the incorporation of elastomeric properties in essentially isotactic homopolymer. Achieving a narrow distribution of such short lengths is important because essentially no atactic polymer is present and therefore the tensile strength of the polymer is high and its tackiness to the touch is low.

The polyolefins of the present invention primarily comprise isotactic blocks, i.e. greater than 50% isotactic material makes up the polymer and preferably greater than 60% isotactic material is present therein. It is important to note that even though these polymers contain such high percentages of isotactic material, they do not exhibit the properties characteristic of crystalline isotactic polypropylene but rather exhibit elastomeric-type properties.

EXAMPLES $^{13}$C Magnetic Resonance spectra were obtained at 135° C. on samples dissolved in 1,2,4-trichlorobenzene. The spectrum reference was the mmmm methyl group assigned at 21.68 ppm for polypropylene and 27.64 ppm for the CH$_2$ of the ethyl branch of polybutene. The pentad analyses were carried out utilizing the following formulae:

(I) %Isotactic=(mmmm+1.5 mmmr)/(total resonances)×100%

(II) $L_{iso}$=3+2 (mmmm/mmmr)

(III) % Syndiotactic=(rrrr+1.5 rrrm)/(total resonances)×100%

(IV) $L_{syn}$=3+2 (rrrr/rrrm)

(V) % Defects=100% −% Iso−% Syn

In order to prepare samples for tensile measurements, about 60 g of the polymer was blended in a Brabender mixer at 190° C. with 0.3 g of Irganox 1010 antioxidant. After cooling, a 6"×6"×2 mm plate was compression molded at 204° c. under 5 tons pressure. Tensile bars were then cut from the plate using a "D" die. The measurement conditions are as described in ASTM D 412-83. Tensile set is the residual elongation to a sample after stretching to 300% of its original length at a rate of 20 inches per minute and then allowing it to recover to zero load at that same rate. Tensile at break is the stress required to break the sample at an elongation rate of 20 inches per minute. Elongation at break is the measured elongation at the break condition.

Melt flow index (M.F.) was determined under ASTM condition L (2160 g, 230° C.) on a Tinius Olsen Plastometer.

EXAMPLE 1

2.2 grams of magnesium ethoxide, 0.5 millimeters of veratrole (1,2-dimethoxybenzene) and 60 milliliters of a 50-50 mixture by volume of titanium tetrachloride-chlorobenzene were stirred for 1 hour at 110° C. then filtered. The solid was treated twice with 60 milliliters of a similar titanium tetrachloride-chlorobenzene mixture at 110° C. for 30 minutes and filters. The solid was washed six times with 100 ml portions of isopentane and dried for two hours using a flow of dry nitrogen at 40° C. Three additional catalysts were prepared according to this procedure with the exception that 0.2 ml, 0.3 ml and 1.0 ml, respectively, of veratrole were employed in the preparation. Table 1 shows the characteristics of the four catalysts including the titanium loading which, it can be seen decreased as increasing amounts of veratrole were used thus demonstrating a strong interaction of the electron donor with the catalytic site. Our experience dictates that lower Ti loading is preferable.

TABLE 1

| Catalyst | Amount of Veratrole (ml) | Ti (% wt) |
|---|---|---|
| A | 0.2 | 5.3 |
| B | 0.3 | 4.2 |
| C | 0.5 | 2.6 |
| D | 1.0 | 2.3 |

EXAMPLE 2

Two catalysts were prepared in a manner identical to that given in Example 1 above with the exception that 2,3-dimethoxytoluene was employed as electron donor instead of veratrole. The titanium loading followed the same trend as in the case of veratrole.

TABLE 2

| Catalyst | Amount of Electron Donor (ml) | Ti (% wt) |
|---|---|---|
| E | 0.5 | 3.7 |
| F | 1.0 | 2.7 |

EXAMPLE 3

Approximately 2,200 ml of propylene was transferred into a 1 gallon stainless steel autoclave along with 160 mmol of hydrogen and the contents were heated to 60° C. 60 microliters of diphenyldimethoxysilane, 2.5 ml of a 5% solution of triethylaluminum in isooctane and 0.32 ml of a mineral oil slurry prepared using 0.5 grams of catalyst C in 10 ml of mineral oil were injected into the autoclave. This liquid phase polymerization was carried out a 67° C. for a period of 1 hour. The 200 grams of polypropylene obtained were analyzed by NMR Spectroscopy and it was determined that the polypropylene composition was 72% isotactic with an average isotactic block length of 16 and 9% syndiotactic with an average syndiotactic block length of 5.

The following Examples utilize a magnesium alkoxide compound of the formula: $Mg_4(OCH_3)_6(CH_3OH)_{10}(1,3-O,OH-C_6H_4)_2$ ('M', a resorcinolate) which was prepared by the dropwise addition of a tetraethoxysilane stabilized 12% magnesium methoxide solution to a solution of resorcinol in methanol. Partial azeotropic desolvation was carried out by slurrying 40 grams of M in 300 grams of cyclohexane containing 120 grams of M in 300 grams of cyclohexane containing 120 grams of tetraethoxysilane and boiling this mixture until a decrease of 20 to 30% in solvent volume had occurred.

EXAMPLE 4

The procatalyst was prepared by stirring 7.8 grams of desolvated M with 12 mmoles of 4-methoxyveratrole in 200 ml of a 50-50 titanium tetrachloride-chlorobenzene solution for 1 hour at 115° C. followed by two washes at 115° C. with fresh 200 ml portions of that solvent mixture followed by a quick rinse (less than 10 minutes) with 100 ml of fresh titanium tetrachloride-chlorobenzene solvent mixture. Excess titanium was removed by exhaustive isopentane rinses and the catalyst was dried under moving nitrogen at 40° C. Ti content was 3.55%. A portion of the dry protocatalyst powder was then made into a 5% slurry in mineral oil.

In the following polymerizations, triethylaluminum was used as a 0.28 molar solution in isoctane. Tiisobutyl aluminum was used as a 0.87 molar solution in heptane. Diethylaluminum chloride was used as a 0.87 molar solution in heptane. Diethylaluminum chloride was used as a 1.5 molar solution in heptane. In run numbers 6 through 12 selectivity control agents were utilized; diisobutyldimethoxysilane as the neat liquid and 2,3,4,5-tetramethylpyrazine as a 12% solution in isooctane.

The polymerizations were carried out by mixing 0.015 to 0.03 mmol of procatalyst plus aluminum alkyl plus SCA and then, after 20 minutes, injecting the mixture into 2.7 liters of liquid propylene in a 1 gallon stainless steel autoclave and carrying out the polymerization for 90 minutes at 67° C. for 90 minutes. The polymer lumps were cut into small pieces and dried for several hours under aspirator vacuum at 80° C. before physical and chemical characterizations were carried out.

The cocatalysts and relative amounts of each used in the various polymerizations are presented in Table 4 along with the amount of polymer produced, the xylene solubles and the melt flow index of each polymer. The xylene solubles levels were extremely high (as compared to known crystalline isotactic polypropylenes) but in no case were any of the polymers sticky.

TABLE 4

Autoclave runs to produce polymer with 4-methoxyveratrole based catalyst (2.7 l propylene, 0.015–0.03 mmol Ti, 67° C., 90 min).

| Run # | Al Alkyl (mol/mol Ti) | | | SCA (mol/mol Ti) | | Yield (Kg/g cat) | X.S. (% wt) | M.F. (g/10 min) |
|---|---|---|---|---|---|---|---|---|
| | TEA | DEAC | TIBAL | DIBDMS | M4PYR | | | |
| 1 | 53 | — | — | — | — | 23.8 | 55.1 | 0.41 |
| 2 | 53 | — | — | (60 mmol H$_2$, no SCA) | | 31.2 | 54.1 | 4.79 |
| 3 | 20 | 70 | — | — | — | 17.5 | 50.5 | 0.52 |
| 4 | — | — | 51 | — | — | 16.8 | 47.5 | 0.39 |
| 5 | 1 | — | — | — | — | 3.6 | 49.5 | 0.39 |
| 6 | 70 | — | — | 15 | — | 8.6 | 39.2 | 0.13 |
| 7 | 70 | — | — | — | 15 | 8.5 | 63.5 | 0.26 |
| 8 | 70 | — | — | 15 | 15 | 7.2 | 39.4 | 0.10 |
| 9 | 23 | 70 | — | 15 | — | 13.2 | 44.0 | 0.24 |
| 10 | — | 93 | — | 15 | — | 6.8 | 50.6 | 0.84 |
| 11 | 70 | 23 | — | — | 15 | 10.5 | 36.9 | 0.22 |

TEA = triethylaluminum
DEAC = diethylaluminum chloride
TIBAL = triisobutylaluminum
DIBDMS = diisobutyldimethoxysilane
M4PYR = tetramethylpyrazine
X.S. = xylene solubles
M.F. = melt flow index (ASTM condition L)

The NMR results for some of the bulk homopolymers produced in the above polymerizations are summarized in Table 4A along with a clarifying description of th cocatlayst combination used to produce each one. It can be seen that all of the polymers exhibit average isotactic block lengths between 13 and 17, the optimum range to exhibit elastomeric properties. In run #7 an SCA was used which is known to induce the formation of syndiotactic polymer. This has caused the syndiotactic level to rise to 27% and the isotactic level to drop below 55%.

TABLE 4A

NMR results for some of the 4-methoxyveratrole polymerizations.

| Run # | Cocatalyst | Iso (%) | $<L_{iso}>$ units | Syn (%) | $<L_{syn}>$ units | X.S. (% wt) |
|---|---|---|---|---|---|---|
| 1 | TEA | 60 | 13 | 20 | 6.4 | 55.1 |
| 4 | TIBAL | 62 | 13.5 | 19.5 | 6.3 | 47.5 |
| 5 | TEA (1 per Ti) | 60 | 13.5 | 21 | 6.3 | 49.5 |
| 6 | TEA/ DIBDMS | 66.5 | 17 | 18 | 7.1 | 39.2 |
| 7 | TEA/ M4PYR | 54 | 13 | 27 | 7.1 | 63.5 |
| 8 | TEA/ (DIBDMS + M4PYR) | 65 | 17 | 20 | 6.9 | 39.4 |
| 10 | DEAC/ DIBDMS | 60 | 14 | 21.5 | 6.5 | 50.6 |

The physical properties of some of the polymers prepared above are summarized in Table 4B. The $T_{set}$ values represent the residual elongation imparted to a sample after stretching to 400 of original length (at a rate of 20 inches per minute) then allowing to relax to zero stress (at the same rate).

TABLE 4B

Tensile data for the polymers prepared in Example 4.

| Run # | $T_{break}$ (psi) | $T_{set}$ (%) | $T_{yield}$ (psi) | Elongation at break (%) |
|---|---|---|---|---|
| 1 | 2920 | 130 | 1381 | 890 |
| 2 | 2342 | 159 | 1392 | 873 |
| 3 | 2755 | 172 | 1342 | 799 |
| 5 | 2595 | 164 | 1176 | 796 |
| 10 | 2342 | 157 | 1172 | 783 |

If tensile set is significantly less than 300%, the polymer is considered elastomeric. Tensile at break or more than 2000 psi indicates toughness uncharacteristic of typical soft polypropylenes. Uniqueness is further demonstrated because crystallin polypropylene exhibits an elongation at break of about 10% and a tensile at break lower than the tensile at yield.

EXAMPLE 5

The magnesium compound 'M' from Example 4 was used to prepare procatalysts in this Example by stirring 7.8 grams of the desolvated M with 8.6 to 14 mmoles of the appropriate substituted veratrole compound (see Table 5) in 200 ml of a 50-50 titanium tetrachloride-chlorobenzene solution for 1 hour at 115° C. followed by two washes at 115° C. with fresh 200 ml portions of that solvent mixture followed by a quick rinse (less than 10 minutes) with 100 ml of fresh solvent mixture. Excess titanium was removed by exhaustive isopentane rinses and the catalyst was dried under moving nitrogen at 40° C. A portion of the dry powder was then made into a 5% slurry in mineral oil. The amounts of each electron donor used and the analytical results for each catalyst are presented in Table 5. Use of higher levels of electron donor in the digest step normally leads to power titanium levels in the final procatalyst. In each case, the goal was to use sufficient electron donor to keep the titanium level below 4% but with 3-methoxyveratrole this was not possible.

TABLE 5

Catalysts with substituted veratroles as electron donors.

| Catalyst # | Electron Donor (name) | (mmol) | Mg (% wt) | Ti (% wt) |
|---|---|---|---|---|
| 1 | none | 0 | 16.5 | 6.55 |
| 2 | VERA | 8.6 | 20.2 | 3.01 |
| 3 | 3 MV | 10 | 19.5 | 3.84 |
| 4 | 30 MV | 10 | 17.9 | 5.78 |
| 5 | 40 MV | 12 | 18.8 | 3.55 |
| 6 | 4 NOV | 14 | 13.8 | 2.93 |

VERA = veratrole
3 MV = 3-methylveratrole
30 MV = 3-methoxyveratrole
40 MV = 4-methoxyveratrole
4 NOV = 4-nitroveratrole For polymerization, procatalysts were combined with triethyl aluminum (TEA) which was used as a 0.28 molar solution in isooctane. The polymerizations were carried out by rejecting a mixture of 0.01 to 0.03 mmoles of protocatalyst and TEA in the ratio shown in Table 5A into 2.7 liters of liquid propylene in a 1 gallon autoclave reactor and then continuing the polymerization at 67° C. for one hour. The polymer lumps were cut into small pieces and dried for several hours under aspirator vacuum at 80° C. before physical and chemical characterizations were carried out. The tensile set, tensile yield, elongation and tensile at break were measured according to ASTM D 412-83 on tensile bars cut with a "D" die from 2 mm compression molded plates.

The polymerization conditions and results are shown in Table 5A. Again, as in Example 4, the xylene soluble levels are extremely high. The polymers made from the procatalysts containing the electron donors were not tacky to the touch, whereas the polymer made via the procatalyst without an electron donor was tacky, indicating the presence of considerable atactic material.

TABLE 5A

Autoclave runs to produce homopolymer with veratrole based catalysts (2.7 liters propylene, 0.01–0.03 mmol Ti, 67° C., 60 min).

| Run # | Cat # | TEA/Ti (mol/mol) | Yield (Kg/g cat/hr) | X.S. (% wt) |
|---|---|---|---|---|
| 1 | 1 | 29 | 24.1 | 62.6 |
| 2 | 2 | 62 | 18.2 | 64.3 |
| 3 | 3 | 50 | 20.7 | 46.8 |
| 4 | 4 | 33 | 28.4 | 46.9 |
| 5 | 5 | 53 | 15.9 | 55.1 |
| 6 | 6 | 64 | 7.0 | 54.3 |
| 7 | 6 | 200 | 11.7 | 47.1 |

TEA = triethylaluminum
X.S. = xylene solubles

The tensile data for the homopolymers produced in the above polymerizations are summarized in Table 5B. The tensile set values reported in 5B differ from those in Table 4B in that the samples were stretched to only 300% of their original length before relaxation.

TABLE 5B

Tensile data for the polymers prepared in Example 5.

| ED | $T_{break}$ (psi) | $T_{set}$ (%) | $T_{yield}$ (psi) | Elongation at break (%) |
|---|---|---|---|---|
| None | 1690 | 85 | 788 | 963 |
| VERA | 2630 | 82 | 871 | 874 |
| 3 MV | 2750 | 92 | 1219 | 814 |
| 30 MV | 2350 | 92 | 1298 | 943 |
| 40 MV | 2920 | 83 | 1381 | 890 |
| 4 NOV | 2152 | 93 | 1258 | 887 |

The NMR results for the homopolymers produced above are summarized in Table 5C. In all cases the polymer is at least 55% isotactic. All of the polymers exhibited average block lengths between 12 and 15 monomer units.

TABLE 5C

NMR results for the polymers prepared in Example 5.

| ED | Iso (%) | $<L_{iso}>$ units | Syn (%) | $<L_{syn}>$ units |
|---|---|---|---|---|
| None | 58 | 12 | 18 | 5.0 |
| VERA | 59 | 12 | 20 | 6.2 |
| 3 MV | 60 | 14 | 17 | 5.6 |
| 30 MV | 64 | 13 | 16 | 5.6 |
| 40 MV | 60 | 13 | 20 | 6.4 |
| 4 NOV | 62 | 15 | 20 | 6.1 |

The conclusions drawn from the above data are the same as those drawn from the data in Tables 4A and 4B.

EXAMPLE 6 (polymerizations in butene)

Butene polymerizations were carried out, in a nearly identical fashion to the propylene polymerizations, in a 1 gallon stainless steel autoclave utilizing 1.8 liter of 1-butene. At the end of 90 minutes the reactions were terminated by injecting 600 ml of isopropyl alcohol to the cooled reactor prior to venting the unreacted monomer. The specific runs, utilizing procatalysts from example #5, are summarized in Table 6A. The pertinent properties of the elastomeric polybutenes are summarized in Table 6B. The NMR results summarized in Table 6C reveal that these catalysts produce short block length polybutene.

TABLE 6A

Autoclave runs to produce polybutylene with veratrole based catalysts (1.8 liters 1-butene, 0.01-0.02 mmol Ti, 60° C., 90 min).

| Run # | Cat # | SCA | SCA/Ti (mol/mol) | TEA/Ti (mol/mol) | Yield (Kg/g cat) |
|---|---|---|---|---|---|
| 1 | #2 from Ex 5 | CYANCL | 4 | 105 | 8.0 |
| 2 | #4 from Ex 5 | DIBDMS | 5 | 107 | 4.2 |
| 3 | #5 from Ex 5 | none | — | 70 | 7.0 |

TEA = triethylaluminum
CYANCL = cyanuric chloride
DIBDMS = diisobutyldimethoxysilane

TABLE 6B

Tensile data for the polymers prepared in Example 6.

| Run # | $T_{break}$ (psi) | $T_{set}$ (%) | $T_{yield}$ (psi) | Elongation at break (%) |
|---|---|---|---|---|
| 1 | 2751 | 162 | no | 485 |
| 2 | 1932 | 166 | yield | 346 |
| 3 | 1609 | 110 | point | 557 |
|  | 1335 | 100 |  | 600 |

These materials have a higher elongation at break than normal crystalline polybutene (300–350%) and a lower tensile at break (4000–5000 psi expected for crystalline polybutene). Elastomeric behavior is indicated by the low tensile set values.

TABLE 6C

NMR results for the polymers prepared in Example 6.

| Run # | ISO (%) | $<L_{iso}>$ units | Syn (%) | $<L_{syn}>$ units |
|---|---|---|---|---|
| 1 | 68 | 17 | 13 | 5.7 |
| 2 | 64 | 16 | 14 | 6.0 |
| 3 | 60 | 10 | 16 | 6.0 |

We claim:

1. A catalyst component useful in the production of elastomeric, primarily isotactic polypropylene and polybutene which comprises the reaction product of a magnesium alkoxide and a tetravalent titanium halide wherein the reaction takes place in the presence of an electron donor which is selected from the group consisting of 3-methyl-veratrole, 3-methoxy-veratrole, 4-nitro-veratrole and 4-methoxy-veratrole.

2. The component of claim 1 wherein the reaction also takes place in the presence of a halogenated hydrocarbon.

3. The catalyst compound of claim 1 wherein the alkoxide is magnesium ethoxide.

4. A catalyst composition useful in the production of elastomeric, primarily isotactic polypropylene which comprises the reaction product of claim 1 and an organoaluminum compound.

5. The catalyst composition of claim 4 wherein the reaction also takes place in the presence of a halogenated hydrocarbon.

6. The catalyst of claim 4 wherein the catalyst composition also includes a selectivity control agent.

7. The catalyst composition of claim 4 wherein the alkoxide is magnesium ethoxide.

* * * * *